April 21, 1959   P. PAKOSH   2,882,753
STEERING AND TRANSMISSION UNIT
Filed May 27, 1957   5 Sheets-Sheet 5

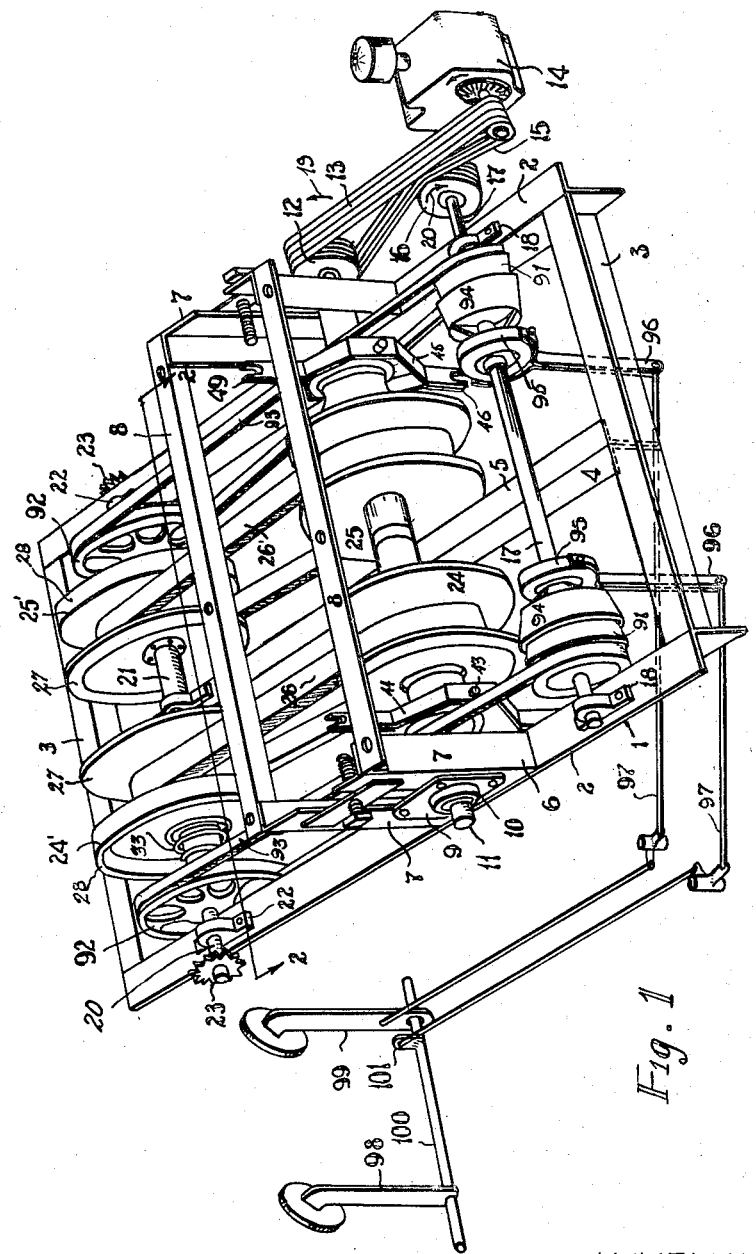

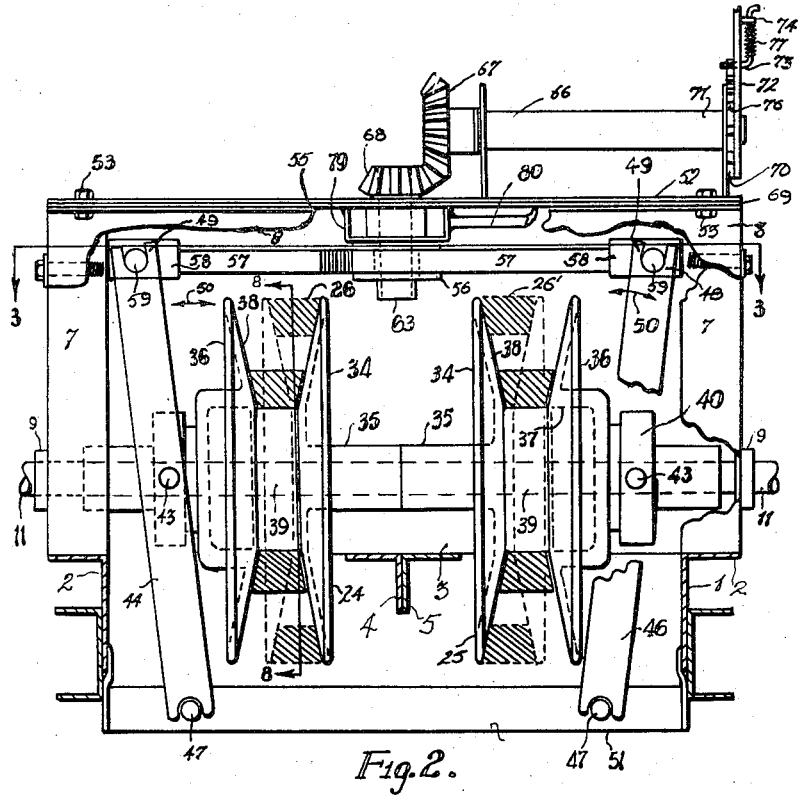

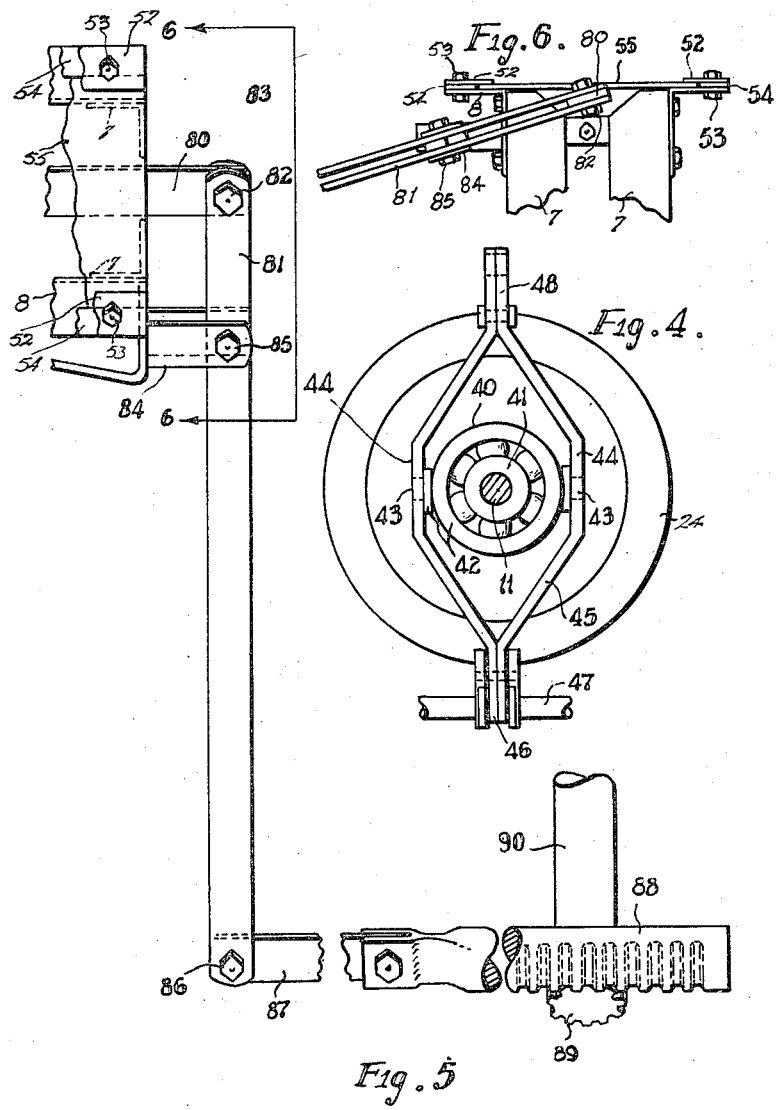

INVENTOR
PETER PAKOSH

United States Patent Office 2,882,753
Patented Apr. 21, 1959

2,882,753

STEERING AND TRANSMISSION UNIT

Peter Pakosh, Winnipeg, Manitoba, Canada, assignor to Northern Royalties and Management Co. Ltd., Winnipeg, Manitoba, Canada, a corporation of Manitoba Application May 27, 1957, Serial No. 661,854

12 Claims. (Cl. 74—722)

My invention relates to new and useful improvements in steering and transmission units primarily designed for use with agricultural implements such as self-propelled combines and swathers, the principal object and essence of my invention being to provide a device of the character herewithin described which utilizes complementary split pulley assemblies, one for each drive wheel and in which the split pulley assemblies are actuated by movement of the steering wheel on a vehicle. Furthermore, the split pulley assemblies on the drive shaft are capable of being disengaged from the belt therearound which then runs on idler pulleys incorporated therein so that a reversing device can be operatively connected to the transmission unit thus enabling either one or both of the drive wheels to be rotated rearwardly.

A further object of my invention is to provide a combination steering and transmission unit which not only permits variable speeds to be accomplished, but also incorporates the steering mechanism of the device.

Yet another object of my invention is to provide a device of the character herewithin described in which the power is on both wheels at all times and in which a constant forward speed is maintained even while turning around corners.

Yet another object of my invention is to provide a device of the character herewithin described in which the reversing operation can be accomplished on either wheel while the machine is in forward motion thereby permitting one wheel to reverse and the other wheel to move forwardly thus enabling extremely sharp turns to be made with the machine in which the device is incorporated.

Still another object of my invention is to provide a device of the character herewithin described which is extremely compact, relatively simple in construction, and otherwise well-suited to the purpose for which it is designed.

With the foregoing objects in view and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a perspective view of my device with the steering means removed for clarity.

Figure 2 is a sectional view substantially along the lines 2—2 of Figure 1, but with the steering means thereon.

Figure 3 is a section substantially along the lines 3—3 of Figure 2, but with the split pulley assemblies not shown in this instance.

Figure 4 is a side elevation of one of the yokes for actuating the endwise shiftable plates of one of the split pulley assemblies.

Figure 5 is a top plan view of one end of the steering means.

Figure 6 is a view substantially along the lines 6—6 of Figure 5.

In the drawings like characters of reference indicate corresponding parts in the different figures.

Figure 7:
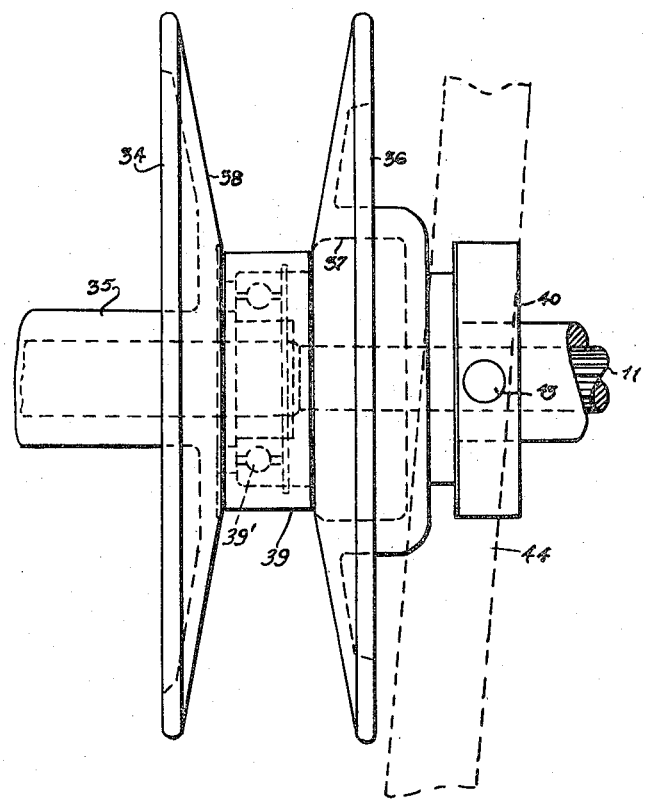
Figure 7 is an enlarged fragmentary view of one of the split pulley assemblies showing the idling pulley incorporated therein.

Proceeding now to describe my invention in detail, it will be seen upon reference to the accompanying drawings that I have only illustrated the steering and transmission unit per se, but it is to be understood that it can be readily mounted within the framework of the implements such as a combine or swather as desired. It comprises a substantially rectangular framework 1 consisting of a pair of longitudinal angle irons 2 and transverse angle irons 3 together with a centrally located pair of longitudinal angle irons 4 and 5.

A superstructure 6 is secured to the pair of longitudinals 2 and extends upwardly therefrom, said superstructure consisting of four vertically situated angle irons 7 spanned by transverse angle irons 8. Between each pair of vertical angle irons 7 I have secured a bearing plate 9 containing bearings 10 within which is journalled for rotation a transversely situated main drive shaft 11.

On the right-hand end with reference to Figure 1 of this drive shaft, multiple pulleys 12 are secured around which the main drive belts 13 extend to connect the drive shaft 11 to a source of power shown schematically by the reference character 14 and which normally will take the form of a gasoline engine. The lower runs 15 of the belts 13 also engage over the upper sides of the further set of multiple pulleys 16 secured to the end of a reversing drive shaft 17 journalled within bearings 18 secured to longitudinals 2 and situated parallel to the main drive shaft 11. From the foregoing, it will be appreciated that if the belts 13 are adapted to rotate the main drive shaft in the direction of arrow 19, then the reversing drive shaft 17 will be rotated oppositely or in the direction of arrow 20'.

Upon the opposite side of the drive shaft 11, I have mounted a pair of driven shafts 20 and 21, each of said driven shafts being journalled for rotation within bearings 22 mounted upon the longitudinals 2 and the central longitudinals 4 and 5, and it will be observed that these drive shafts are in axial alignment one with the other. Sprockets 23 are secured to the outboard ends of the driven shafts 20 and 21 and are adapted to be connected one each to each of the drive wheels of the vehicle within which the device is mounted.

Two split pulley assemblies 24 and 25 are mounted upon the main drive shaft 11 and complementary split pulley assemblies collectively designated 24' and 25' are mounted upon each of the driven shafts 20 and 21. Belts 26 and 26' extend around split pulley assemblies 24 and 24' and 25 and 25' respectively thus permitting drive to be transmitted from the drive shaft to each of the driven shafts as desired and as will hereinafter be described.

Figure 9:
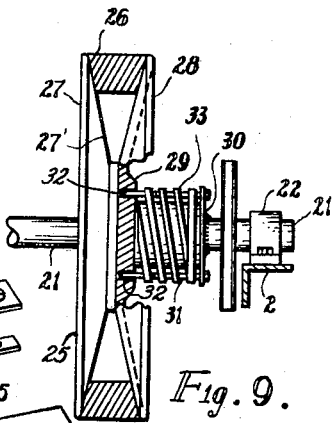
Figure 9 is a fragmentary partly sectioned view of one of the split pulley assemblies on the driven shaft.

Dealing first with the construction of the split pulley assemblies 24' and 25' mounted upon the driven shafts 20 and 21, reference should be made to Figure 9 of the accompanying drawings which shows one of the assemblies.

Each of these split pulley assemblies consists of an inboard plate or disc 27 secured to the corresponding driven shaft and rotatable thereby. This plate together with all of the other plates hereinafter to be described in connection with the split pulley assemblies, is provided with a concave or coned inner surface 27' as clearly illustrated and in this connection it should be observed that the sides of the belts 26 and 26' also incline complementary to the slopes of the sides of these plates.

An outboard plate 28 is also mounted for rotation upon shafts 20 and 21, but are adapted to be moved endwise therealong through the agency of splines upon the hub 29 of the plate 28 and upon the portion of the shafts 20 or 21 upon which it is situated. However, as this splining relationship for endwise movement is conventional, it has not been illustrated in these drawings.

A disc 30 is secured to each shaft 20 and 21 carrying guide pins 31 which in turn engage drilling 32 within the hub 29 and a compression spring 33 surrounds this hub and reacts between the disc 30 and the endwise shiftable plate normally maintaining this plate towards the fixed plate 27, but permitting the movable plate to be shifted endwise against pressure of spring 33.

The split pulley assemblies 24 and 25 upon the main drive shaft 11 are shown in detail in Figures 2 and 7. Each of the pulley assemblies consists of an inboard plate 34 secured to the drive shaft 11 and including hubs 35 which surround the drive shaft.

Outboard endwise shiftable plates 36 are also mounted upon shaft 11 by means of splines (not illustrated) which insure that they rotate with the shaft 11, but permit limited endwise movement therealong.

These outboard plates 36 are provided with a recess 37 upon the inner faces 38 thereof and an idling pulley 39 is mounted for free rotation on ball race 39' upon the shaft 11 and between the fixed plate 34 and the movable plate 36, the aforementioned recess 37 permitting the movable plate to approach the fixed plate in both instances.

From the foregoing, it will be appreciated that if the plates 34 and 36 are separated so that the belts 26 engage the idling pulleys 39, then no power will be transmitted between the drive shaft and the driven shaft. However, if the movable plates are moved towards the fixed plates, the belt 26 travels upwardly on the sloping sides of the plate and thus transmits drive to the corresponding split pulley assemblies on the driven shaft.

The speed variation of the transmission is governed by the distance between the fixed and movable plates of the split pulley assemblies. Means are provided to engage the belts 26 and 26' selectively either upon the idling pulleys 39 or upon the split pulley assemblies 24 and 25 and means are also provided to increase the distance between the plates of the split pulley assemblies 24 and to decrease the distance between the plates of the split pulley assemblies 25 simultaneously and vice versa, thus permitting steering to be accomplished. Each outboard plate 36 of the split pulley assemblies on the drive shaft 11 is provided with a bearing 40 including an inner race 41 and an outer race 42, it being understood that the inner race rotates with the shaft 11 whereas the outer race 42 is stationary. Pins 43 extend outwardly from the outer race 42 and are engageable by the arms 44 of a yoke 45. The arms 44 converge downwardly and terminate in a pair of bracket ends 46, said bracket ends being bifurcated and adapted to engage over a stationary shaft 47 mounted longitudinally within the framework and below the main shaft thus acting as a pivot for the yoke 45. The arms 44 also converge upwardly and terminate in bracket ends 48 which are slotted in their upper extremities as clearly shown in Figures 1 and 2 and are indicated by the reference character 49. From the foregoing it will be appreciated that movement of the yokes in the direction of the double headed arrow 50 will cause outward and inward movement of the outer plates 36 inasmuch as the yoke pivots on the rods 47 which are supported upon cross members 51.

Figure 10:
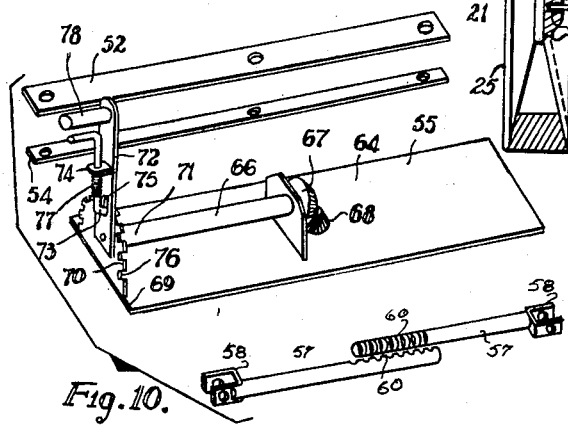
Figure 10 is a fragmentary exploded view of the steering means per se.

Reference should be made to Figures 2 and 10 relative to the operating means for the yoke. A strap 52 is secured upon each of the transverse superstructure members 8 by means of bolts 53 with a relatively narrow spacer 54 therebetween, thus providing a guide or channel within which a steering plate 55 may slide transversely. This steering plate, which is rectangular when viewed in plan, is provided with a casting 56 upon the under side thereof, said casting adapted to support for endwise movement a pair of rack rods 57 which are in turn connected by their outer ends 58 thereof to each of the upper ends 48 of the aforementioned yokes 44, pivot pins 59 connecting them together. The inner ends 60 of the rack rods are provided with rack piece 61 engageable by a rack gear 62 situated therebetween, said gear being secured to the lower end of a shaft 63 supported in turn for rotation within the aforementioned steering plate 55.

Upon the upper surface 64 of the steering plate, I provide a bearing plate 65 adjacent the shaft 63 which assists in supporting a transversely situated shaft 66 upon the inner end of which is a bevelled gear 67 meshing with a further bevelled gear 68 secured to the upper end of the aforementioned shaft 63.

Adjacent one end 69 of the steering plate 55, I provide a semi-circular serrated quadrant plate 70 which also supports the other end 71 of the shaft 66. A vertical lever 72 is secured to the end 71 of shaft 66 and a pin 73, supported by a bracket 74 is mounted upon lever 72 with the end passing through the aperture 75 therein and engaging within one of the serrations 76 within the quadrant plate 70. A spring 77 normally maintains the pin 73 in engagement with one of the serrations in the quadrant plate, but this pin can be raised to disengage the pin therefrom thus permitting the shaft 66 to be rotated by movement of the lever 72 operated manually by means of the extending pin 78. This lever is utilized to engage the belts 26 either upon the idling pulleys 39 or upon the split pulley assemblies 24 or 25. Rotation of the lever 72 in one direction causes the rack rods 57 to move either away from one another or towards one another. If the rack rods move towards one another, this causes the endwise movable plate 36 of the split pulley assemblies to move away from the fixed plate 34 thereof thus permitting the belts 26 to move towards the drive shaft 11 and engage idling pulleys 39, it being understood that the spring operated split pulley assemblies upon the drive shaft force the corresponding movable plate towards the fixed plate due to the aforementioned springs 33. With the belts engaging the idling pulleys 39, the reversing mechanism which will be explained subsequently, is enabled to be engaged. It will also be appreciated that the lever 72 controls the distance between the plates of the pairs of split pulley assemblies thus controlling the speed ratio of the engine to the driven shafts 20 and 21.

Above the aforementioned casting 56 upon the underside of the steering plate 55 is a bracket 79 through which shaft 63 extends and secured to one side of this bracket is a main steering arm 80 which extends to one side of the device and is illustrated in Figures 5 and 6. A twin strut strap lever 81 is pivotally connected by pin 82 to the outboard end 83 of the steering lever 80 and is in turn supported within bracket 84 by means of pivot pin 85 at a distance spaced from pin 82.

This twin lever 81 extends beyond pivot 85 for a considerable distance thus giving a mechanical advantage and the pivot pin connected as at 86 to the main steering link 87 which terminates with rack 88 engageable by a gear 89 secured to the lower end of the steering wheel shaft 90. From the foregoing, rotation of shaft 90 by the steering wheel (not illustrated) will cause the steering arm 80 to move inwardly or outwardly thus carrying with it the steering plate 55 and the assembly connected thereto. This will cause the yokes 44 to move in the same direction as the steering plate thus causing one of the endwise shiftable plates 36 to move away from the fixed plate 34 and the other one to move towards the fixed plate 34. Due to the compression springs 33 on the corresponding split pulley assemblies on the driven shaft, the corresponding moving plates on these pulley assemblies will move oppositely.

Figure 8:
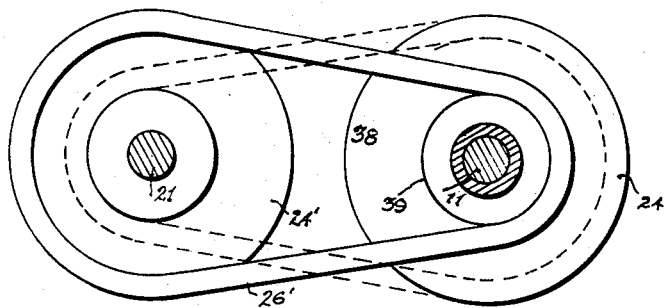
Figure 8 is a schematic side elevation of one of the split pulley assemblies on the drive shaft and its complementary split pulley assembly on the driven shaft.

The extreme positions of the split pulley assemblies on the drive shaft and the driven shaft is illustrated in Figure 8, the solid line of the belt 26 showing that the plates on the driving shaft are in their furthermost apart position whereas the plates on the driven shaft are at their closest position. The phantom line illustrating the belt 26 shows the exact opposite condition thus illustrating the extremes in gear ratio that can be obtained.

From the foregoing, it will be appreciated that if the steering plate 55 is moved leftwardly with relation to Figures 1 and 2, the split pulley 24 will open to its widest position and the split pulley 24' will close to its narrowest position thus reducing the speed of the driven shaft 20 upon which the split pulley assembly 24' is mounted. At the same time the split pulley assembly 25 will be in its narrowest position and the corresponding pulley assembly 25' at its widest position thus speeding up the drive shaft 21 upon which the pulley assembly 25' is mounted. This permits accurate steering to be accomplished, the degree of turn being dependent upon the distance between the plates on the pulley assemblies 24 and 25. When the steering plate 55 is in the neutral or central position, of course, the plates of split pulley assemblies 24 and 25 are the same distance apart and therefore, the drive to the driven shaft 21 is equal and the vehicle will proceed in a straight line.

When it is desired to reverse either one or both of the main vehicle drive wheels, then the reverse mechanism has to be utilized. This reverse mechanism operates when the belts 26 and 26' are riding upon the aforementioned idling pulleys 39 and it should be pointed out that either one or both of the drive wheels can be reversed as desired.

The aforementioned reversing shaft 17 carries adjacent its outer ends, a combination pulley-and-clutch member 91 journalled freely for rotation upon shaft 17. Each of the drive shafts 20 and 21 carries adjacent its outer end a corresponding pulley 92 secured to the driven shaft for rotation therewith and belts 93 extend between the corresponding clutch member 91 and the pulleys 92.

Complementary clutch members 94 are connected for endwise movement on shaft 17 by means of splines (not illustrated), members 91 and 94 making up the two parts of a conventional cone clutch assembly.

Bearings 95 similar to bearings 40 on the yokes 44 are also connected to the members 94 and yoke shafts 96 extend downwardly therefrom below the general framework 1.

Linkage collectively designated 97 extends from each of the yoke shafts 96 to left and right-hand reverse pedals 98 and 99 respectively. Pedal 98 is mounted rigidly upon a cross-shaft 100 and includes a lug 101 secured thereto to which the corresponding linkage is secured whereas pedal 99 is freely mounted upon shaft 100 and the linkage for its operation is connected directly to the pedal.

In operation of the reversing mechanism, it should be stressed once again that either left or righthand driven shafts can be reversed singly or together as desired. However, the reverse mechanism can only be brought into operation when the corresponding belts 26 or 26' is riding upon the idler pulley 39. Assuming that belt 26 is riding upon idler pulley 39, operation of the left-hand reverse pedal 98 causes the cone clutch member 94 which is rotating with shaft 17, to engage the idling cone clutch member 91 thus transmitting drive direct to the driven shaft in a reverse direction.

By engaging both left and right-hand reverse pedals, the vehicle will move rearwardly in a straight line, but by engaging just one or the other of the reverse mechanisms then either the left or right-hand wheel will reverse thus giving a steering action to the reverse travel.

Alternatively, of course, one wheel may be maintained in a forwardly rotating direction and the other may be reversed thus permitting the vehicle to be turned in an extremely short radius which is extremely useful under certain conditions.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A steering and transmission unit for agricultural implements and the like including a steering wheel and mechanism connecting said stering wheel operatively with said unit; comprising in combination with a source of power, a framework for said unit, a main drive shaft journalled for rotation in said framework, a pair of driven shafts journalled for rotation in said framework, and parallel to said drive shaft, said driven shafts being in axial alignment one with the other, said source of power being drivably connected to said drive shaft, a pair of split pulley assemblies mounted on said drive shaft, a split pulley assembly mounted on each of said driven shafts, each in alignment with one of said split pulley assemblies on said drive shaft, each of said split pulley assemblies including two plates, and belts extending around each of said split pulley assemblies on said drive shaft and said split pulley assemblies on said driven shaft, an idling pulley associated with each of said split pulley assemblies on said drive shaft, means on said framework adapted to engage said belts on said idler pulleys or said split pulley assemblies, and further means operably connected to said first mentioned means and to said steering mechanism adapted to vary the distance between the plates of each of said split pulley assemblies on said drive shaft inversely one with the other, and a reversing mechanism incorporated within said framework, said reversing mechanism including a reversing drive shaft journalled for rotation in said framework parallel to said drive shaft and also connected to said source of power, said reversing drive shaft adapted to be rotated by said source of power in a direction opposite to said drive shaft, an idling pulley-and-clutch member journalled for free rotation on each end of said reversing drive shaft, a complementary pulley secured for rotation upon each of said drive shafts, a belt extending around each one of said idling pulley-and-clutch members and each of said complementary pulleys on said driven shaft, a complementary endwise shiftable clutch member journalled for rotation adjacent each end of said reversing drive shaft, and independent means adaptable to engage and disengage each of said pairs of clutch members.

2. The device according to claim 1 in which each of said split pulley assemblies on said drive shaft comprises an inboard fixed plate secured for rotation to said drive shaft and an endwise shiftable outboard plate splined to said drive shaft and rotatable therewith, said endwise movable pulleys being recessed on the inner faces thereof to slide over said idling pulleys.

3. The device according to claim 2 in which said further means on said framework for varying the distance between the plates of said split pulley assemblies on said drive shaft includes a yoke connected to each of said endwise movable plates on said drive shaft, said yokes being pivoted to said framework at the base thereof and engaging said each movable plate substantially medially the ends thereof, a steering plate mounted for transverse sliding movement upon said framework and above said drive shaft, means for mounting said plate, the upper ends of said yoke being operatively connected to said plate, said plate operatively connected to said steering wheel, the movement of said steering plate adapted to move said outboard plate towards said inboard plate on one of said split pulley assemblies on said drive shaft and to move the other of said outboard plates away from the other of said inboard plates on said drive shaft and vice versa.

4. The device according to claim 3 in which said means on said framework adapted to engage said belt on said idler pulleys or said split pulley assemblies includes a pair of rack rods pivotally connected by one end thereof to each of the upper ends of said yokes, a bearing on the underside of said steering plate for supporting said rack rods for opposite endwise movement, a vertical shaft bearably supported through said steering plate, and a gear on the lower end thereof engageable between said rack rods, a horizontal shaft journalled for rotation on the upper side of said steering plate, gears on one end of said shaft and on the other end of said vertical shaft in meshing relationship, and a lever and quadrant on said steering plate for actuating said second mentioned shaft whereby movement thereof is adapted to move both of said movable plates of said split pulley assemblies on said drive shaft away from the corresponding fixed plates thereon and vice-versa.

5. The device according to claim 1 in which said split pulley assemblies on each of said driven shafts comprise an inboard plate secured for rotation on said driven shaft and an endwise shiftable outboard plate secured for rotation on each of said driven shafts, and a compression spring surrounding said driven shafts and adapted normally to urge said outboard plates towards said inboard plates.

6. The device according to claim 2 in which said split pulley assemblies on each of said driven shafts comprise an inboard plate secured for rotation on said driven shaft and an endwise shiftable outboard plate secured for rotation on each of said driven shafts, and a compression spring surrounding said driven shafts and adapted normally to urge said outboard plates towards said inboard plates.

7. The device according to claim 3 in which said split pulley assemblies on each of said driven shafts comprise an inboard plate secured for rotation on said driven shaft and an endwise shiftable outboard plate secured for rotation on each of said driven shafts, and a compression spring surrounding said driven shafts and adapted normally to urge said outboard plates towards said inboard plates.

8. The device according to claim 4 in which said split pulley assemblies on each of said driven shafts comprise an inboard plate secured for rotation on said driven shaft and an endwise shiftable outboard plate secured for rotation on each of said driven shafts, and a compression spring surrounding said driven shafts and adapted normally to urge said outboard plates towards said inboard plates.

9. A steering and transmission unit for agricultural implements and the like including a steering wheel and mechanism connecting said steering wheel operatively with said unit; comprising in combination with a source of power, a framework for said unit, a main drive shaft journalled for rotation in said framework, a pair of driven shafts journalled for rotation in said framework, and parallel to said drive shaft, said driven shafts being in axial alignment one with the other, said source of power being drivably connected to said drive shaft, a pair of split pulley assemblies mounted on said drive shaft, a split pulley assembly mounted on each of said driven shafts, each in alignment with one of said split pulley assemblies on said drive shaft, each of said split pulley assemblies including two plates, and belts extending around each of said split pulley assemblies on said drive shaft and said split pulley assemblies on said driven shafts, an idling pulley associated with each of said split pulley assemblies on said drive shaft, means on said framework adapted to engage said belts on said idler pulleys or said split pulley assemblies, and further means operably connected to said first mentioned means and to said steering mechanism adapted to vary the distance between the plates of each of said split pulley assemblies on said drive shaft inversely one with the other, said further means on said framework for varying the distance between the plates of said split pulley assemblies on said drive shaft including a yoke connected to each of said endwise movable plates on said drive shaft, said yokes being pivoted to said framework at the base thereof and engaging said each movable plate substantially medially the ends thereof, a steering plate mounted for transverse sliding movement upon said framework and above said drive shaft, means for mounting said plate, the upper ends of said yoke being operatively connected to said plate, said plate operatively connected to said steering wheel, the movement of said steering plate adapted to move said outboard plate towards said inboard plate on one of said split pulley asesmblies on said drive shaft and to move the other of said outboard plate away from the other of said inboard plate on said drive shaft and vice-versa.

10. The device according to claim 9, in which said means on said framework adapted to engage said belt on said idler pulleys or said split pulley assemblies includes a pair of rack rods pivotally connected by one end thereof to each of the upper ends of said yokes, a bearing on the underside of said steering plate for supporting said rack rods for opposite endwise movement, a vertical shaft bearably supported through said steering plate, and a gear on the lower end thereof engageable between said rack rods, a horizontal shaft journalled for rotation on the upper side of said steering plate, gears on one end of said shaft and on the other end of said vertical shaft in meshing relationship, and a lever and quadrant on said steering plate for actuating said second mentioned shaft whereby movement thereof is adapted to move both of said movable plates of said split pulley assemblies on said drive shaft away from the corresponding fixed plates thereon and vice-versa.

11. The device according to claim 9 in which said split pulley assemblies on each of said driven shafts comprise an inboard plate secured for rotation on said driven shaft and an endwise shiftable outboard plate secured for rotation on each of said driven shafts, and a compression spring surrounding said driven shafts and adapted normally to urge said outboard plates towards said inboard plates.

12. The device according to claim 10 in which said split pulley assemblies on each of said driven shafts comprise an inboard plate secured for rotation on said driven shaft and an endwise shiftable outboard plate secured for rotation on each of said driven shafts, and a compression spring surrounding said driven shafts and adapted normally to urge said outboard plates towards said inboard plates.

References Cited in the file of this patent
UNITED STATES PATENTS

| | | |
|---|---|---|
| 2,582,966 | Curtis | Jan. 22, 1952 |
| 2,595,229 | Curtis | May 6, 1952 |